Patented Sept. 26, 1950

2,523,759

UNITED STATES PATENT OFFICE 2,523,759

BITUMEN-GLASS FIBER COMPOSITE MANUFACTURES

John A. Grant, Granville, Ohio, assignor to Owens-Corning Fiberglas Corporation, a corporation of Delaware No Drawing. Application November 26, 1947, Serial No. 788,324.

11 Claims. (Cl. 117—126)

This invention relates to the manufacture of bituminous coatings and products as roofing, pipe wrap, waterproofing layers, flashings, shingles and the like, and to a bituminous material reinforced with a fibrous carrier.

Bituminous materials are applied to various surfaces for the purposes of providing a waterproofing and weather resistant coating, as in the case of roofing, and for protecting surfaces against physical, chemical and electrical attack, as in the case of underground pipe. The effectiveness of the bituminous material is dependent, to a great extent, on the amount that can be built up on the surface and the strength of the bond between the bituminous material and the surface to be protected.

In order to secure maximum thickness of the bituminous layer, use has heretofore been made of fibrous fabrics for carrying and reinforcing the bituminous material. The bitumen may be applied as a hot melt directly to the surfaces to be protected previously wrapped with the carrying and reinforcing fabric, or prefabricated into a shingle in which the fabric has been incorporated. A fabric of glass fibers is particularly well suited for carrying and reinforcing the bituminous material because it occupies very little space and the fine glass fibers are non-absorbent, have exceptionally high strength, and are inert, that is, they are characterized by being resistant to moisture, non-inflammable, non-corrosive, and resistant to heat, weather, and to physical, chemical and electrical attack.

Although woven textile fabrics of glass fibers are suitable, it is more economical to employ mats and bats in which the glass fibers are haphazardly arranged in jackstraw fashion and bonded in the mat or bat with a resinous material. In either case, the usefulness of the glass fiber fabric, as a carrier and reinforcement, has been limited by the inability of the bituminous substances freely to wet the woven glass fibers or resinous coated glass fibers and penetrate through the fabric. The result has been that the full complement of bitumen could not be carried by the fabric and the desired bond between the bitumen and the surface to be coated was not effected, especially when the bitumen was applied as a hot melt after the surface had been covered or wrapped with the glass fiber fabric.

An object of this invention is to produce a carrying and reinforcing fabric of glass fibers treated with a bitumen containing adhesive to provide a base receptive to bituminous impregnants, so that the bituminous layer will not readily delaminate or separate from the surface to be protected.

Another object is to produce a low cost mat of glass fibers bonded with a resin-bitumen composition whereby the mat is readily wet by bituminous materials in the production of pipe wrap, roofing, waterproofing membranes, and the like.

A further object is to produce a bituminous product in which bitumen is carried and reinforced by a glass fiber fabric having the characteristics of mass integrity, even at the elevated temperatures of bituminous impregnation, and a ready impregnatable surface coat receptive to the bituminous material, and also to produce a method for accomplishing same.

I have discovered that a bituminous product, in which the bitumen completely and readily penetrates the porous glass fiber fabric used for carrying and reinforcing the bitumen, may be produced by employing a bitumen, as an ingredient, in the binder for setting the fibers in the fabric and then subsequently impregnating the fabric with the main body of bituminous material.

The term "bitumen" or "bituminous materials" as used herein, is inclusive of the materials set forth in the publication of Herbert Abraham entitled "Asphalts and Allied Substances," fifth edition, published by the Van Nostrand Company of New York, New York. Such materials as natural asphalt, blown asphalt, steam refined asphalt, coal tar, coal tar pitch, petroleum pitch, gilsonite and the like, are well-known bitumens characterized by viscous flow at hot melt temperature in the range of 150 to 450° F., and capable, in such condition, of being applied, as by flow coating, brushing or mopping, over surfaces to be covered and protected.

In the preparation of a carrying and reinforcing fabric of glass fibers, the preferred binder composition contains bitumen in admixture with a phenolic-aldehyde resinous reaction product, such as phenol-aldehyde, cresol-aldehyde, xylenol-aldehyde. Other heat hardenable resinous reaction products may be used, such, for example, as the amino-aldehydes, i. e., urea-formaldehyde and melamine-formaldehyde, aniline-aldehyde, furanes, furfuryl alcohol with or without furfuraldehyde, and the polyesters including their unsaturated and copolymerized reaction products. Excellent results have been obtained with phenol-formaldehyde and modifications thereof with an elastomer of the type chloroprene or butadiene-acrylonitrile copolymer in which 0.5 to 3 parts of elastomer is combined with one part of phenolic resin. When the phenolic resin is compatible with the elastomer reaction products are produced which impart to the fabric the characteristics of both the elastomer and the resin. In other words, the fabric has increased strength, moisture resistance, flexibility, resiliency resulting from the presence of the elastomer, while retaining its inertness and mass integrity from the phenolic resin component.

A stable solution containing the desired resin and bitumen may be formed with mutual organic solvent, but in the case of phenol-formaldehyde, urea-formaldehyde and other heat hardenable resins having a water soluble or water dispersible intermediate reaction product, an aqueous diluent may be used so that the process is free of the high cost and dangers ordinarily attributed to the use of organic solvents. For instance, "A" stage phenolic resin in water solution may be combined with an aqueous emulsion of the bitumen to produce a stable treating composition.

Since it is desirable to produce a porous fabric, which is able to support a large volume of bituminous impregnating material, it is inadvisable to load the glass fiber fabric with these resin-bitumen binders, it being desirable only to furnish an amount sufficient to hold the fibers together in the fabric and to provide a base, which is readily wet by the bitumen subsequently to be applied. Five to forty per cent binder in the final product has been found sufficient, and optimum conditions are obtained by the use of only ten to twenty per cent binder solids. It is best that the heat hardenable resin predominates in the composition; that is, a ratio is maintained of between one to five parts of bitumen to five to twenty parts of the resin. However, equal parts, and even formulations in which the amount of bitumen exceeds the heat hardenable resin, have been successfully used. For purposes of lubricity, the formulation may contain as much as one to four per cent of an oleaginous material, which ordinarily is incompatible with the heat hardenable resin, although not necessarily with the bitumen.

Describing briefly the treatment of the glass fibers in mat formation, it being understood that woven glass fiber fabrics may also be used, binder application from liquid compositions containing five to forty per cent solids generally is made in any suitable manner, such, for example, as by spraying onto the fibers as they are rained down from above and gathered in the desired haphazard and jackstraw arrangement in matted form. By controlling the solids content of the composition and the amount of spray, a practical manner is provided for regulating the amount of binder in the final product, and by varying the rate at which the matted fibers are conducted away from the forming hood, the thickness of the mat may be varied from a mat of thin cross section to a bat of heavy cross section. By subjecting the treated mat to elevated temperatures in the range of 250 to 450° F., for from five to twenty-five minutes, the diluent is driven off and the heat hardenable resinous material is converted to an advanced polymeric stage, which generally is an insoluble and infusible stage.

It appears that chemical combination between the ordinarily saturated and non-reactive bitumen and the heat hardenable resin does not result, and when the resinous material is converted to its advanced polymeric stage, such separation takes place between the resinous material and the bitumen as will enable each to retain the majority of its original properties. Thus the thermosetting resin is able to become infusible, insoluble and relatively inert and to bind the fibers together in the bat or mat even in the presence of the high heat during bituminous impregnation. In fact, there is reason to believe that a large portion of the bitumen sweats out on the surfaces of the treated fibers, where it is able more effectively to provide the wettable surface desired for the bituminous impregnant. At the same time, the heat hardened resin concentrates at the glass fiber interface, where it is in position to bind the fibers together in the mat. Thus, the apparent incompatibility between the bitumen and the heat hardened resinous material, especially phenol-aldehyde, amino-aldehyde, phenol-aldehyde-elastomer combinations and the furfuryl type resins and their derivatives, contribute to the development of an excellent bituminous-impregnatable mat with a minimum amount of binder material.

The treated mat may be impregnated with bituminous material in hot melt or diluted form to produce salable products, such as shingles, tar paper and the like. More frequently, the mat is applied on a surface to be coated and then the bitumen is applied as a hot melt to the mat. Because of the bitumen on the surfaces of the glass fibers of the mat, penetration and impregnation of the hot melt is rapid and complete, enabling the voids in the fabric to be filled and good adherence established between the bitumen and the surface to be coated. Application may also be made from aqueous dispersions containing as much as ninety per cent bitumen and employing casein, soaps, chalk clays and the like, as emulsifying agents. It is often desirable to employ the same type of bitumen in the binder as will subsequently be used for impregnation.

The following examples of glass fiber carrying and reinforcing fabrics and products formed therefrom are given by way of illustration but not by way of limitation.

*Example 1*

The glass fibers, as they are rained down from above, are sprayed with a composition containing five per cent by weight of steam refined asphalt and fifteen per cent by weight of water soluble "A" stage phenolaldehyde resin (alkaline catalyzed). The asphalt, which may originally be supplied in seventy per cent water dispersion employing casein as the emulsifying agent, is admixed with the water soluble "A" stage phenolic resin. The mixture is diluted with water to the desired percentage and then sprayed onto the fibers in an amount to deposit approximately twenty per cent binder, taken as solid asphalt and resin, in the reinforcing and carrying fabric. The mat is continuously moved at a rate calculated to form a mat of the desired thickness and carried through an oven at about 450° F. for a time sufficient to drive off the water and advance the phenolic resin to an insoluble and infusible stage, i. e., about ten minutes. The resulting fabric is a highly porous mat, the fibers of which are adhered together to impart mass integrity and coated to provide a base readily wetted by the bituminous material applied as a hot melt. Excellent results are obtained when the bituminous impregnant is of the same character as that used in the binder, but in actual practice other bitumens readily obtainable from nearby stations are used.

Example 2

To the phenolaldehyde-bitumen composition described in Example 1, there is added one to two per cent of an oleaginous material, such as a hydrocarbon oil of the type described in the Williams and Bone Patent No. 2,083,132, dated June 8, 1937. The oleaginous material, added from aqueous emulsion, is incompatible with the phenolic resin and serves mainly to lubricate and protect the glass fibers during mat formation and use. Incidentally, the hydrocarbon oil may plasticize the bitumen and provide a softer and more receptive surface for the bituminous impregnant. Instead of a hot melt, impregnation may be effected with a bituminous emulsion of high solids content followed by a baking operation at a temperature sufficient to drive off the water diluent and fuse the bituminous materials, whereby adherence both to the surface to be treated and the treated glass fiber is effected to form a composite mass. Temperatures in the range of 250 to 450° F. are sufficient.

Example 3

To fourteen pounds of acrylonitrile-butadiene copolymer (Hycar OR 15 or Hycar OR 25 elastomer) originally in forty per cent concentration in water emulsion, sufficient additional water is added to dilute the solids to about ten per cent. Six pounds of water soluble "A" stage phenolic resin (Durez 12369 or Catavar 156) are diluted with water to about four per cent solids and then the two are blended together by adding the phenolic solution to the elastomer emulsion. With this mixture there is blended five pounds of blown asphalt in aqueous dispersion employing bentonite as the dispersing agent. The entire batch is diluted with water to about eight per cent solids and sprayed onto the glass fibers during mat or fabric formation. Immediately following this step, the mat is baked at 400° F. for about fifteen minutes.

A finished thin mat or fabric produced by the above process is excellent for use as a pipe wrap, in which the mat is wrapped about metal pipe for underground use. Describing briefly the application of the resulting fabric as a pipe wrap, the pipe to be placed underground is first coated with a bituminous hot melt and before the bitumen has had a chance to harden, the prepared mat is wrapped thereabout. The bitumen soaks through the mat which is then able to act as the carrier and reinforcing agent. When desired, another top layer of the bituminous hot melt may be after applied. The mat is tough and flexible so that it can be easily wrapped about the pipe without danger of breakage. Its exposed surface is so highly porous and so readily wetted by the hot melt of bituminous material that the bituminous melt flows freely through the mat. The strength, inertness and safety characteristic of the bonded glass fiber fabric and the rapidity and completeness of penetration of the bituminous melt through the fabric are characteristics that have been sought for a long time in connection with roofing, pipe wrap and waterproofing membranes.

Example 4

A resin emulsion is formed by the reaction of twenty-nine parts furfuryl alcohol in water solution catalyzed by elevated temperatures in the range of 95 to 100° C. and about 0.3 to 1.0 per cent acid or acid forming catalyst of the type HCl. The resin emulsion is admixed with petroleum pitch in aqueous emulsion so that the ratio of resin to asphalt is about two to one. The mixture diluted to twenty per cent solids content is sprayed on the glass fibers as they are formed into a mat and the mat is baked for about twenty minutes at 250° F. The result is a porous mat, which is dark brown in color and is readily wet by a hot melt of an asphaltic material. This is particularly advantageous in the fabrication of shingles, roofing, waterproofing membranes or protective coatings on soil pipes. Instead of a furfuryl alcohol resinous reaction product, an amino aldehyde, which is acid catalyzed, may be used.

From a comparative standpoint, the high strength, porosity and inertness, which is possible with a glass fiber fabric of the type described, far surpasses that which is obtainable with fabrics employing fibrous materials of a different nature. Novel means are provided for securing a bituminous receptive surface on the glass fibers while at the same time bonding the fibers one to another in fabric form. Such rapid and complete penetration of the bituminous material is achieved that the maximum concentration of bitumen is retained on the surface to be protected and this enables the reinforcing and carrying fabric to become an integral part of the surface coating. The rapidity of through flow also enables the hot melt firmly to become bonded to the surfaces to be protected before solidification.

Although it is apparent that the finished product may be a roofing, pipe wrap, water resistant membrane and the like formed of bituminous materials carried by and reinforced with resinous bonded glass fibers, it will be understood that the mat itself formed of glass fibers bonded with a composition containing a resinous material to adhere the fibers one to another in the mat and a bitumen for providing a receptive surface for the bituminous materials, subsequently to be applied, is also a product capable of separate sale and use.

It will be further understood that numerous changes in materials, their manner of application and treatment, may be effected without departing from the spirit of the invention especially as defined in the appended claims.

I claim:

1. An article of manufacture comprising a structure of glass fibers and a coating on the glass fiber surfaces comprising a thermosetting resin in combination with a bitumen incompatible with the thermosetting resin when in an advanced stage of polymeric growth wherein the proportion of the thermosetting resin with respect to the bitumen increases toward the glass fiber surfaces and is present in greater concentration than the bitumen adjacent the glass fiber surfaces while the proportion of the bitumen gradually increases toward the outer surface of the coating.

2. An article of manufacture comprising a fabric of glass fibers and a coating on the glass fiber surfaces comprising a phenol formaldehyde resin in combination with a bitumen wherein the proportion of the phenol formaldehyde resin with respect to the bitumen increases toward the glass fiber surfaces and is present in greater concentration than the bitumen adjacent the glass fiber surfaces and the proportion of the bitumen increases toward the outer surface of the coating.

3. An article of manufacture comprising a fabric of glass fibers, a coating on the glass fiber surfaces comprising a phenol formaldehyde resin in combination with a bitumen wherein the portion of the phenol formaldehyde resin with respect to the bitumen increases toward the glass fiber surfaces and is present in greater concentration than the bitumen adjacent the glass fiber surfaces and the proportion of the bitumen increases toward the outer surface of the coating, and a bituminous composition impregnating the fabric of coated fibers.

4. An article of manufacture comprising a fabric of glass fibers and a coating on the glass fiber surfaces comprising a phenol formaldehyde-butadiene acrylonitrile copolymer present in the ratio of 0.5 to 3 parts of the copolymer to 1 part of the phenol formaldehyde resin in combination with an insoluble bitumen insoluble therewith as a dispersed phase wherein the concentration of the bitumen is less than the resin copolymer at the glass fiber surfaces but increases in concentration toward the outer surface of the coating.

5. An article of manufacture suitable for subsequent impregnation by bituminous material comprising glass fibers arranged in a porous mat and 5 to 40 per cent by weight of a bonding coating the glass fiber surfaces, said composition comprising a bituminous material in admixture with an incompatible cured phenolaldehyde resin, the proportion of resin with respect to the bitumen increasing toward the glass fiber surfaces and being present in greater concentration than the bitumen adjacent the glass fiber surfaces while the bitumen is in greater concentration at the outer surface of the coating.

6. An article of manufacture as claimed in claim 5 in which the coating composition contains 10 to 50 per cent by weight bitumen and 50 to 90 per cent by weight cured phenol formaldehyde resin.

7. The process of preparing a bonded structure of glass fibers for subsequent impregnation with bituminous material comprising coating the glass fibers with a composition comprising a bitumen and a compatible thermosetting resinous material advanced to an intermediate stage of polymeric growth and present in the ratio of 1 to 5 parts by weight bitumen to 5 to 20 parts by weight resin, and heating the coated fibers at a temperature of 250 to 450° F. until the thermosetting resin is advanced to the cured stage in situ on the glass fiber surfaces whereupon the thermosetting resin becomes incompatible with the bitumen distributed therein as the dispersed phase, the concentrations of material being such that the resinous material predominates at the glass fiber surfaces.

8. The process for producing a bituminous impregnated fabric of glass fibers comprising treating the glass fibers as claimed in claim 7 and then impregnating the coated structure with a hot melt of bituminous material.

9. An article of manufacture comprising glass fibers and a coating on the glass fiber surfaces comprising a thermosetting resin in combination with a bitumen incompatible with the resin when the latter is in an advanced stage of polymeric growth, wherein the proportion of the thermosetting resin with respect to the bitumen increases towards the glass fiber surfaces and is present in greater concentration than the bitumen adjacent the glass fiber surfaces while the bitumen predominates at the outer surfaces of the coating.

10. An article of manufacture comprising a glass fiber fabric and a coating on the glass fiber surfaces comprising a phenol-formaldehyde resin in combination with a bitumen wherein the proportion of the phenol-formaldehyde resin with respect to the bitumen increases towards the glass fiber surfaces and is present in greater concentration than the bitumen adjacent the glass fiber surfaces while the bitumen predominates over the resin at the outer surface of coating.

11. An article of manufacture comprising a glass fiber fabric and a coating on the glass fiber surfaces comprising a phenol-formaldehyde resin in combination with a bitumen wherein the proportion of the phenol-formaldehyde resin with respect to the bitumen increases towards the glass fiber surfaces and is present in greater concentration than the bitumen adjacent the glass fiber surfaces while the bitumen predominates over the resin at the outer surface of the coating, and a bituminous composition impregnating the fabric of coated fibers.

JOHN A. GRANT.

REFERENCES CITED

The following references are of record in the file of this patent:

UNITED STATES PATENTS

| Number | Name | Date |
|---|---|---|
| 1,396,021 | Burmingham et al. | Nov. 8, 1921 |
| 2,230,272 | Slayter | Feb. 4, 1941 |
| 2,306,347 | Slayter | Dec. 22, 1942 |
| 2,335,102 | Bergin | Nov. 23, 1943 |
| 2,391,368 | Underwood | Dec. 18, 1945 |